US008460083B2

(12) United States Patent
Joshi et al.

(10) Patent No.: US 8,460,083 B2
(45) Date of Patent: Jun. 11, 2013

(54) GAMING TERMINAL WITH MULTI-LEVEL PROGRESSIVE JACKPOT

(75) Inventors: Shridhar P. Joshi, Skokie, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 2340 days.

(21) Appl. No.: 10/763,638

(22) Filed: Jan. 23, 2004

(65) Prior Publication Data

US 2005/0059481 A1 Mar. 17, 2005

(51) Int. Cl.
*A63F 9/24* (2006.01)
*A63F 13/00* (2006.01)

(52) U.S. Cl.
USPC .................. 463/20; 463/16; 463/21; 463/25; 463/26; 463/27

(58) Field of Classification Search
USPC ..................................... 463/1, 16–22, 40, 42
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,655,961 | A | 8/1997 | Acres et al. | 463/27 |
| 5,766,076 | A | 6/1998 | Pease et al. | 463/27 |
| 5,779,549 | A | 7/1998 | Walker et al. | 463/42 |
| 5,816,918 | A | 10/1998 | Kelly et al. | 463/16 |
| 5,855,515 | A | 1/1999 | Pease et al. | 463/27 |
| 5,876,284 | A | 3/1999 | Acres et al. | 463/25 |

(Continued)

FOREIGN PATENT DOCUMENTS

| | | | |
|---|---|---|---|
| CA | 2 334 546 | A1 | 8/2001 |
| DE | 195 15 983 | A1 | 11/1996 |

(Continued)

OTHER PUBLICATIONS

"Big Games Safari" Product Sheet, IGT, 24 pages (2000).

(Continued)

*Primary Examiner* — Steven J Hylinski
(74) *Attorney, Agent, or Firm* — Nixon Peabody LLP

(57) ABSTRACT

A gaming terminal for playing a wagering game and having a special payout. The gaming terminal includes a basic game having a randomly selected outcome. The gaming terminal includes a side-wager option. In response to a player not choosing the side-wager option, the gaming terminal provides the player with a first probability greater than zero of achieving a special-payout outcome. In response to the player choosing the side-wager option, the gaming terminal provides the player with a second probability of achieving the special-payout outcome. The second probability is greater than the first probability.

35 Claims, 7 Drawing Sheets

U.S. PATENT DOCUMENTS

| | | | | |
|---|---|---|---|---|
| 5,885,158 | A | 3/1999 | Torango et al. | 463/27 |
| 5,941,773 | A | 8/1999 | Harlick | 463/26 |
| 6,007,427 | A | 12/1999 | Wiener et al. | 463/17 |
| 6,012,982 | A | 1/2000 | Piechowiak et al. | 463/16 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A * | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,186,894 | B1 * | 2/2001 | Mayeroff | 463/20 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,254,483 | B1 | 7/2001 | Acres | 463/26 |
| 6,309,310 | B1 * | 10/2001 | Shira | 473/331 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,520,855 | B2 | 2/2003 | DeMar et al. | 463/20 |
| 6,589,115 | B2 | 7/2003 | Walker et al. | 463/25 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,648,762 | B2 | 11/2003 | Walker et al. | 463/25 |
| 6,712,695 | B2 | 3/2004 | Mothwurf et al. | 463/25 |
| 6,733,390 | B2 | 5/2004 | Walker et al. | 463/23 |
| 6,913,531 | B1 * | 7/2005 | Yoseloff | 463/13 |
| 7,029,395 | B1 * | 4/2006 | Baerlocher | 463/20 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0027618 | A1 | 2/2003 | Byrne | 463/16 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0064776 | A1 | 4/2003 | Byrne | 463/16 |
| 2003/0064807 | A1 * | 4/2003 | Walker et al. | 463/42 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 * | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0038741 | A1 | 2/2004 | Gauselmann | 463/42 |
| 2004/0048644 | A1 | 3/2004 | Gerrard et al. | 463/16 |
| 2004/0166918 | A1 * | 8/2004 | Walker et al. | 463/16 |
| 2004/0242315 | A1 * | 12/2004 | Paulsen et al. | 463/20 |
| 2005/0054429 | A1 * | 3/2005 | Baerlocher et al. | 463/25 |
| 2006/0211474 | A1 * | 9/2006 | Walker et al. | 463/16 |

FOREIGN PATENT DOCUMENTS

| | | | |
|---|---|---|---|
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2313792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO/03/026754 | A1 | 4/2003 |
| WO | WO 03/083789 | A1 | 10/2003 |

OTHER PUBLICATIONS

"Cast for Cash™" Product Sheet, WMS Gaming Inc., 4 pages (no date).

"New '97 Games," International Gaming & Wagering Business, 24 pages (Mar. 1997).

"Multi-Pay Plus" Product Sheet, WMS Gaming Inc., 4 pages (1997).

Article for "Easy Riches" by Sigma Game, Strictly Slots, 1 page (Aug. 2001).

Article for "Millioniser" by Glenn Hausman, Strictly Slots, pp. 50-53 (Mar. 2004).

* cited by examiner

Regular Game without the side bet

Cycle 1048576

Regular Reels

| | Reel #1 | Reel #2 | Reel #3 | Reel #4 | Reel #5 |
|---|---|---|---|---|---|
| PROG | 2 | 2 | 2 | 2 | 2 |
| LOGO | 1 | 1 | 1 | 1 | 1 |
| CLINT | 6 | 11 | 2 | 3 | 3 |
| WOMAN | 7 | 2 | 11 | 10 | 10 |
| **TOTAL** | 16 | 16 | 16 | 16 | 16 |

R gular Pays

| | | | | | Reel #1 | Reel #2 | Reel #3 | Reel #4 | Reel #5 | Hits | Hits (1 in) | Pay | EV |
|---|---|---|---|---|---|---|---|---|---|---|---|---|---|
| PROG | PROG | PROG | PROG | PROG | 2 | 2 | 2 | 2 | 2 | 32 | 23730.47 | 500 | 2.11% |
| PROG | PROG | PROG | PROG | | 2 | 2 | 2 | 2 | 14 | 224 | 3390.067 | 50 | 1.47% |
| PROG | PROG | PROG | | | 2 | 2 | 2 | 14 | 16 | 1792 | 423.7584 | 10 | 2.36% |
| LOGO | LOGO | LOGO | LOGO | LOGO | 1 | 1 | 1 | 1 | 1 | 1 | 759375 | 100 | 0.01% |
| LOGO | LOGO | LOGO | LOGO | | 1 | 1 | 1 | 1 | 14 | 14 | 54241.07 | 50 | 0.09% |
| LOGO | LOGO | LOGO | | | 1 | 1 | 1 | 14 | 15 | 210 | 3616.071 | 10 | 0.28% |
| CLINT | CLINT | CLINT | CLINT | CLINT | 6 | 11 | 2 | 3 | 3 | 1188 | 639.2045 | 40 | 6.26% |
| CLINT | CLINT | CLINT | CLINT | | 6 | 11 | 2 | 3 | 12 | 4752 | 159.8011 | 15 | 9.39% |
| CLINT | CLINT | CLINT | | | 6 | 11 | 2 | 12 | 15 | 23760 | 31.96023 | 5 | 15.64% |
| WOMAN | WOMAN | WOMAN | WOMAN | WOMAN | 7 | 2 | 11 | 10 | 10 | 15400 | 49.31006 | 20 | 40.56% |
| WOMAN | WOMAN | WOMAN | WOMAN | | 7 | 2 | 11 | 10 | 5 | 7700 | 98.62013 | 10 | 10.14% |
| WOMAN | WOMAN | WOMAN | | | 7 | 2 | 11 | 5 | 15 | 11550 | 65.74675 | 2 | 3.04% |
| Totals | | | | | | | | | | 64575 | | | **91.35%** |

Fig. 7a

Game with the Extra Coin side bet

Cycle 759375

| Extra coin Reels | Reel #1 | Reel #2 | Reel #3 | Reel #4 | Reel #5 |
|---|---|---|---|---|---|
| PROG | 1 | 1 | 1 | 1 | 1 |
| LOGO | 1 | 1 | 1 | 1 | 1 |
| CLINT | 6 | 11 | 2 | 3 | 3 |
| WOMAN | 7 | 2 | 11 | 10 | 10 |
| **TOTAL** | 15 | 15 | 15 | 15 | 15 |

| Extra Coin Adds Scattered PROG: | | | | | Reel #1 | Reel #2 | Reel #3 | Reel #4 | Reel #5 | Hits | Hits (1 in) | Pay | EV |
|---|---|---|---|---|---|---|---|---|---|---|---|---|---|
| PROG | PROG | PROG | PROG | PROG | 3 | 3 | 3 | 3 | 3 | 243 | 3125 | 700 | 22.40% |
| PROG | PROG | PROG | PROG | | 3 | 3 | 3 | 3 | 12 | 972 | 781.25 | 60 | 7.68% |
| PROG | PROG | PROG | | PROG | 3 | 3 | 3 | 12 | 3 | 972 | 781.25 | 60 | 7.68% |
| PROG | PROG | | PROG | PROG | 3 | 3 | 12 | 3 | 3 | 972 | 781.25 | 60 | 7.68% |
| PROG | | PROG | PROG | PROG | 3 | 12 | 3 | 3 | 3 | 972 | 781.25 | 60 | 7.68% |
| | PROG | PROG | PROG | PROG | 12 | 3 | 3 | 3 | 3 | 972 | 781.25 | 60 | 7.68% |
| PROG | PROG | PROG | | | 3 | 3 | 3 | 12 | 12 | 3888 | 195.3125 | 6 | 3.07% |
| PROG | PROG | | PROG | | 3 | 3 | 12 | 3 | 12 | 3888 | 195.3125 | 6 | 3.07% |
| PROG | PROG | | | PROG | 3 | 3 | 12 | 12 | 3 | 3888 | 195.3125 | 6 | 3.07% |
| PROG | | PROG | PROG | | 3 | 12 | 3 | 3 | 12 | 3888 | 195.3125 | 6 | 3.07% |
| PROG | | PROG | | PROG | 3 | 12 | 3 | 12 | 3 | 3888 | 195.3125 | 6 | 3.07% |
| PROG | | | PROG | PROG | 3 | 12 | 12 | 3 | 3 | 3888 | 195.3125 | 6 | 3.07% |
| | PROG | PROG | PROG | | 12 | 3 | 3 | 3 | 12 | 3888 | 195.3125 | 6 | 3.07% |
| | PROG | PROG | | PROG | 12 | 3 | 3 | 12 | 3 | 3888 | 195.3125 | 6 | 3.07% |
| | PROG | | PROG | PROG | 12 | 3 | 12 | 3 | 3 | 3888 | 195.3125 | 6 | 3.07% |
| | | PROG | PROG | PROG | 12 | 12 | 3 | 3 | 3 | 3888 | 195.3125 | 6 | 3.07% |
| Totals | | | | | | | | | | 43983 | | | **91.52%** |

| Extra Coin Paytable Pays | | | | | Reel #1 | Reel #2 | Reel #3 | Reel #4 | Reel #5 | Hits | Hits (1 in) | Pay | EV |
|---|---|---|---|---|---|---|---|---|---|---|---|---|---|
| LOGO | LOGO | LOGO | LOGO | LOGO | 1 | 1 | 1 | 1 | 1 | 1 | 759375 | 500 | 0.07% |
| LOGO | LOGO | LOGO | LOGO | | 1 | 1 | 1 | 1 | 14 | 14 | 54241.07 | 100 | 0.18% |
| LOGO | LOGO | LOGO | | | 1 | 1 | 1 | 14 | 15 | 210 | 3616.071 | 50 | 1.38% |
| CLINT | CLINT | CLINT | CLINT | CLINT | 6 | 11 | 2 | 3 | 3 | 1188 | 639.2045 | 50 | 7.82% |
| CLINT | CLINT | CLINT | CLINT | | 6 | 11 | 2 | 3 | 12 | 4752 | 159.8011 | 20 | 12.52% |
| CLINT | CLINT | CLINT | | | 6 | 11 | 2 | 12 | 15 | 23760 | 31.96023 | 5 | 15.64% |
| WOMAN | WOMAN | WOMAN | WOMAN | WOMAN | 7 | 2 | 11 | 10 | 10 | 15400 | 49.31006 | 20 | 40.56% |
| WOMAN | WOMAN | WOMAN | WOMAN | | 7 | 2 | 11 | 10 | 5 | 7700 | 98.62013 | 10 | 10.14% |
| WOMAN | WOMAN | WOMAN | | | 7 | 2 | 11 | 5 | 15 | 11550 | 65.74675 | 2 | 3.04% |
| Totals | | | | | | | | | | 64575 | | | **91.36%** |

Fig. 7b

GAMING TERMINAL WITH MULTI-LEVEL PROGRESSIVE JACKPOT

RELATED APPLICATIONS

This application is a continuation-in-part of U.S. patent application Ser. No. 10/659,878, filed Sep. 11, 2003 now abandoned.

FIELD OF THE INVENTION

The present invention relates generally to gaming terminals and, more particularly, to a gaming terminal and a gaming terminal network having an enhanced progressive game.

BACKGROUND OF THE INVENTION

Gaming terminals, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. In existing progressive jackpots, the progressive jackpot may not be directly linked to the basic game. Also, players do not interact at all with the progressive jackpot.

Thus, there is a need for increasing player excitement by intertwining the progressive jackpot with the basic game.

SUMMARY OF THE INVENTION

In accordance with one aspect of the present invention, there is provided a gaming system having a special payout with a first payout and a second payout. The gaming system includes a gaming terminal for playing a basic game having a randomly selected outcome. The gaming terminal has a side-wager input device for allowing a player to be eligible to win the special payout. In response to activation of the activation device, the gaming terminal credits the player the first payout when a first randomly selected outcome is achieved in the basic game and the gaming terminal credits the player the second payout when a second randomly selected outcome is achieved in the basic game.

In accordance with another aspect of the present invention, there is provided a gaming system including a plurality of gaming terminals that conduct wagering games. Located above and coupled to the plurality of gaming terminals is signage. The signage includes a signage controller which controls the special payout for players at the gaming terminals.

In accordance with another aspect of the present invention, there is provided a gaming terminal for playing a wagering game and having a special payout. The gaming terminal includes a basic game having a randomly selected outcome. The gaming terminal includes a side-wager option. In response to a player not choosing the side-wager option, the gaming terminal provides the player with a first probability greater than zero of achieving a special-payout outcome. In response to the player choosing the side-wager option, the gaming terminal provides the player with a second probability of achieving the special-payout outcome. The second probability is greater than the first probability.

The above summary of the present invention is not intended to represent each embodiment, or every aspect, of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

FIG. 7*a* is a table illustrating the statistics of a gaming system when the side-wager option is not chosen.

FIG. 7*b* is a table illustrating the statistics of a gaming system when the side-wager option is chosen.

Figure 1:
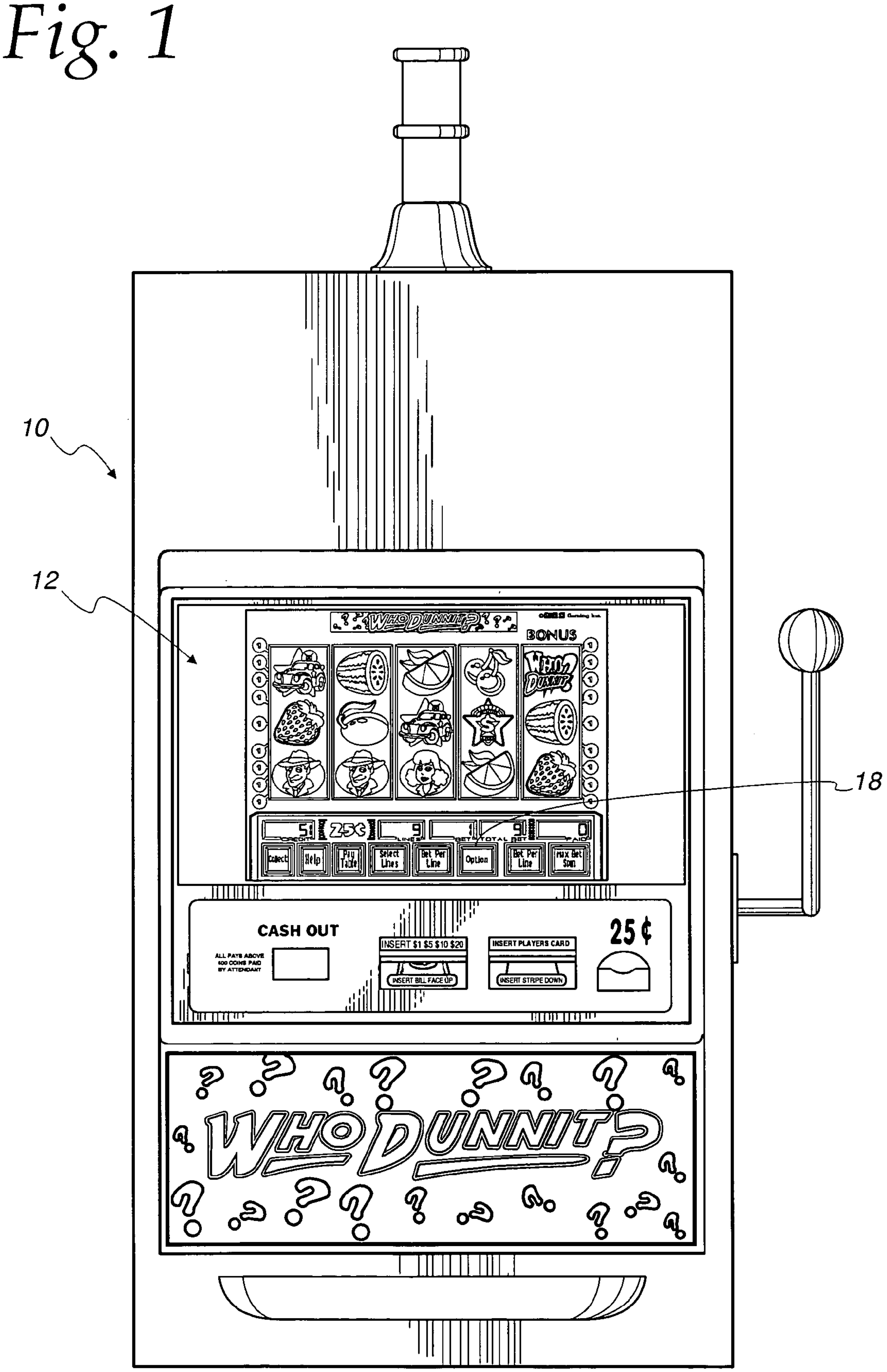
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming terminal 10 is depicted that may be used to implement the enhanced progressive game according to the present invention. The gaming terminal 10 includes a video display 12 that may comprise a CRT, LCD, plasma, LED, electro-luminescent display, or generally any type of video display known in the art. In the illustrated embodiment, the gaming terminal 10 is an "upright" version in which the video display 12 includes a touch screen and is oriented vertically relative to the player. It will be appreciated, however, that any of several other models of gaming terminals are within the scope of the present invention, including, for example, a "slant-top" version in which the video display is slanted at about a 30° angle toward the player, or gaming terminals that include mechanical, rather than video, displays.

In one embodiment, the gaming terminal 10 is operable to play a game entitled WHO DUNNIT?™ having a mystery theme. The WHO DUNNIT?™ game features a basic game in the form of a slot machine having a randomly selected outcome. In the WHO DUNNIT?™ game, the outcome is determined by five simulated spinning reels featuring a variety of symbols. Such a gaming terminal is disclosed in detail in U.S. Publication No. US 2002/0090990 A1, which is incorporated herein by reference in its entirety. It will be appreciated, however, that the gaming terminal 10 may be implemented with games other than the WHO DUNNIT?™ game and/or with several alternative game themes.

Figure 2:
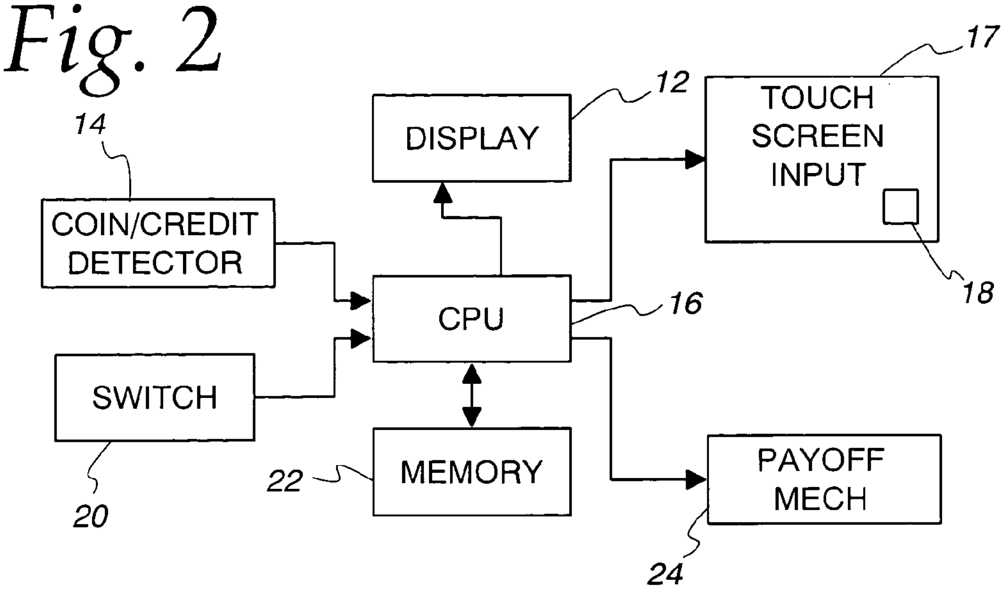
FIG. 2 is a block diagram of the gaming terminal of FIG. 1.

FIG. 2 is a block diagram of a control system suitable for operating the gaming terminal 10. Coin/credit detector 14 signals a CPU 16 when a player has inserted a number of coins or played a number of credits. Then, the CPU 16 executes a game program which causes the video display 12 to display the basic game that includes simulated reels with symbols displayed thereon. The player may select the number of paylines to play and the amount to wager via touch screen input keys 17.

The touch screen input keys 17 include a side-wager input device, such as an option key, button, or switch 18 (hereinafter "option key 18"), also shown in FIG. 1. The option key 18 allows the player to be eligible to enter to win a progressive payout which is described in more detail below.

The basic game commences in response to the player activating a switch 20 in a lever or push button, causing the CPU 16 to set the reels in motion, randomly select a game outcome, and then stop the reels to display symbols corresponding to the pre-selected game outcome. Preferably, certain basic game outcomes cause the CPU 16 to enter a bonus mode, which causes the video display 12 to show a bonus game, as is known in the art. Other outcomes cause the player to win a progressive game jackpot, which is described below with reference to FIG. 5.

A system memory 22 stores control software, operational instructions, and data associated with the gaming terminal 10. In one embodiment, the system memory 22 comprises a separate read-only memory (ROM) and battery-backed random-access memory (RAM). It will be appreciated, however, that the system memory 22 may be implemented on any of several alternative types of memory structures or may be implemented on a single memory structure. A payoff mechanism 24 is operable in response to instructions from the CPU 16 to award a payoff of coins or credits to the player in response to certain winning outcomes which may occur in the basic game or bonus game. The payoff amounts corresponding to certain combinations of symbols in the basic game are predetermined according to a pay table stored in the system memory 22. The payoff amounts corresponding to certain outcomes of the bonus game are also stored in the system memory 22.

The gaming terminal 10 of FIGS. 1 and 2 is a gaming terminal that receives inputs and randomly selects outputs and displays outputs, as controlled by the internal CPU 16. It will be appreciated, however, that the present invention can be used by gaming terminals controlled by external CPUs.

While the gaming terminal 10 of FIGS. 1 and 2 has been described with respect to providing a player a basic game and a bonus game, the gaming terminal 10 can be connected to a progressive payout to which several gaming terminals are linked. The progressive payout, or jackpot, includes multiple payouts or jackpots that are awarded to the player. This gaming network and, in particular, the novel wagering feature that allows the player of the gaming terminal 10 to enter play for the progressive jackpot will be described below with reference to FIGS. 3-6.

Figure 3:
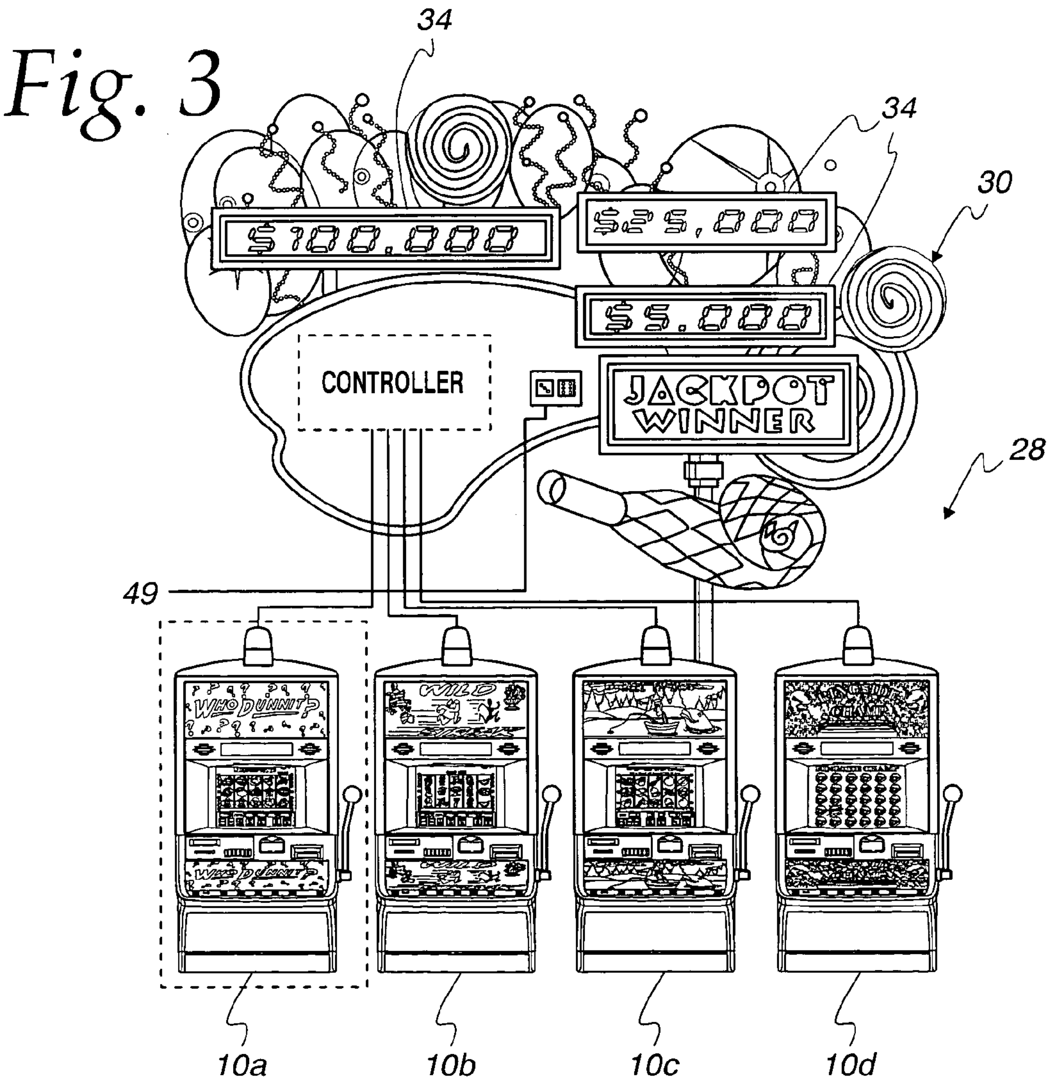
FIG. 3 is a gaming system of interconnected video gaming terminals and signage according to one embodiment of the present invention.

Referring now to FIG. 3, a gaming system 28 of gaming terminals 10*a*, 10*b*, 10*c*, 10*d* is shown. The four gaming terminals 10*a*, 10*b*, 10*c*, 10*d* are of the type described above in relation to FIGS. 1 and 2. The four gaming terminals 10*a*, 10*b*, 10*c*, 10*d* are interconnected and included under signage 30. The signage 30 includes at least one jackpot screen 34 displaying a plurality of dollar amounts for a multi-level progressive payout or progressive jackpot. In this embodiment, there are three dollar amount levels: a Mini Jackpot, a Maxi Jackpot, and a Mega Jackpot. In other embodiments, there may be any number of progressive jackpots.

The signage 30 includes a signage controller 36 that is connected to each of the four gaming terminals 10*a*, 10*b*, 10*c*, 10*d*. The signage controller 36 transmits information to and receives information from the CPU 16 (FIG. 2) in each of the four gaming terminals 10*a*, 10*b*, 10*c*, 10*d* throughout the game. The gaming system 28 allows for various aspects of the gaming terminals 10*a*, 10*b*, 10*c*, 10*d*, such as updating the progressive jackpots to be controlled through the signage controller 36 in the signage 30. Thus, all of the gaming terminals 10*a*, 10*b*, 10*c*, 10*d* are linked to the progressive game.

Figure 4:
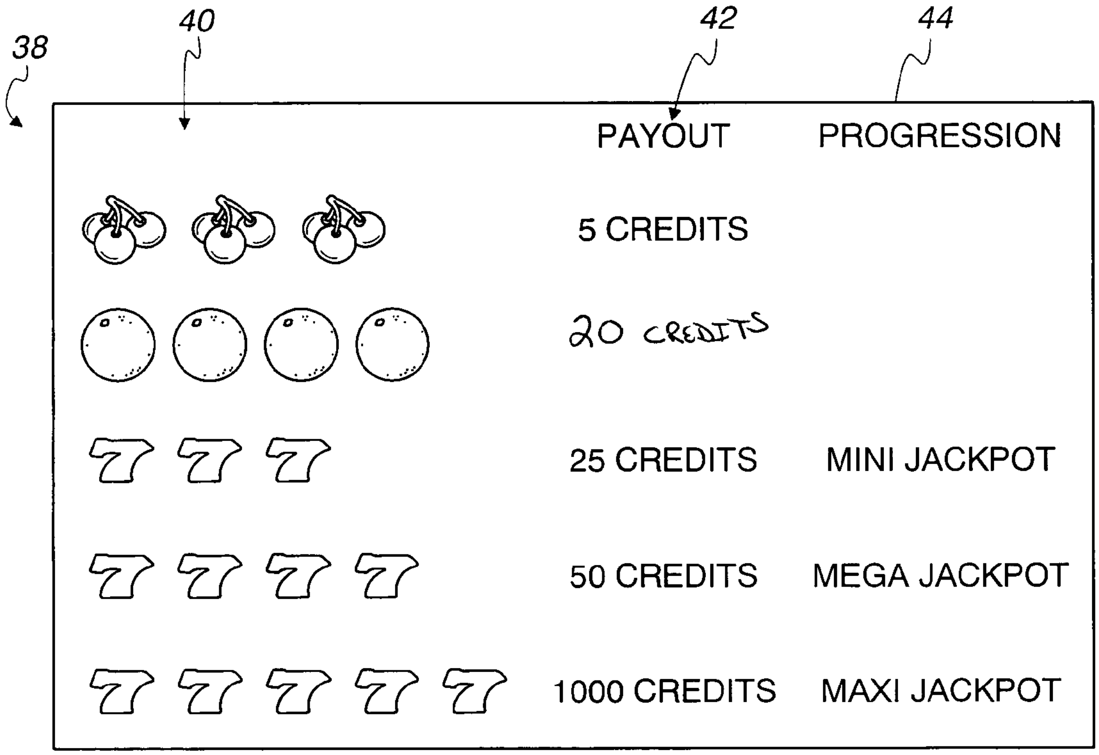
FIG. 4 is an illustration of a pay table on the gaming terminal of FIG. 1.

Turning now to FIG. 4, a pay table 38 will be described. The pay table 38 illustrates to players of the gaming terminals 10*a*, 10*b*, 10*c*, 10*d* what the wining combination of symbols are and how many credits the player is awarded for achieving a winning outcome. The pay table 38 includes a first column 40 indicating the winning combinations of symbols. A second column 42 defines the amount that the player is awarded in a basic game for achieving one of these outcomes. All of the outcomes listed in the first column 40 have a corresponding payout amount in the second column 42. A third column 44 identifies which of the outcomes in the first column 40 trigger payout of the progressive jackpots and which progressive jackpots are won.

Figure 5:
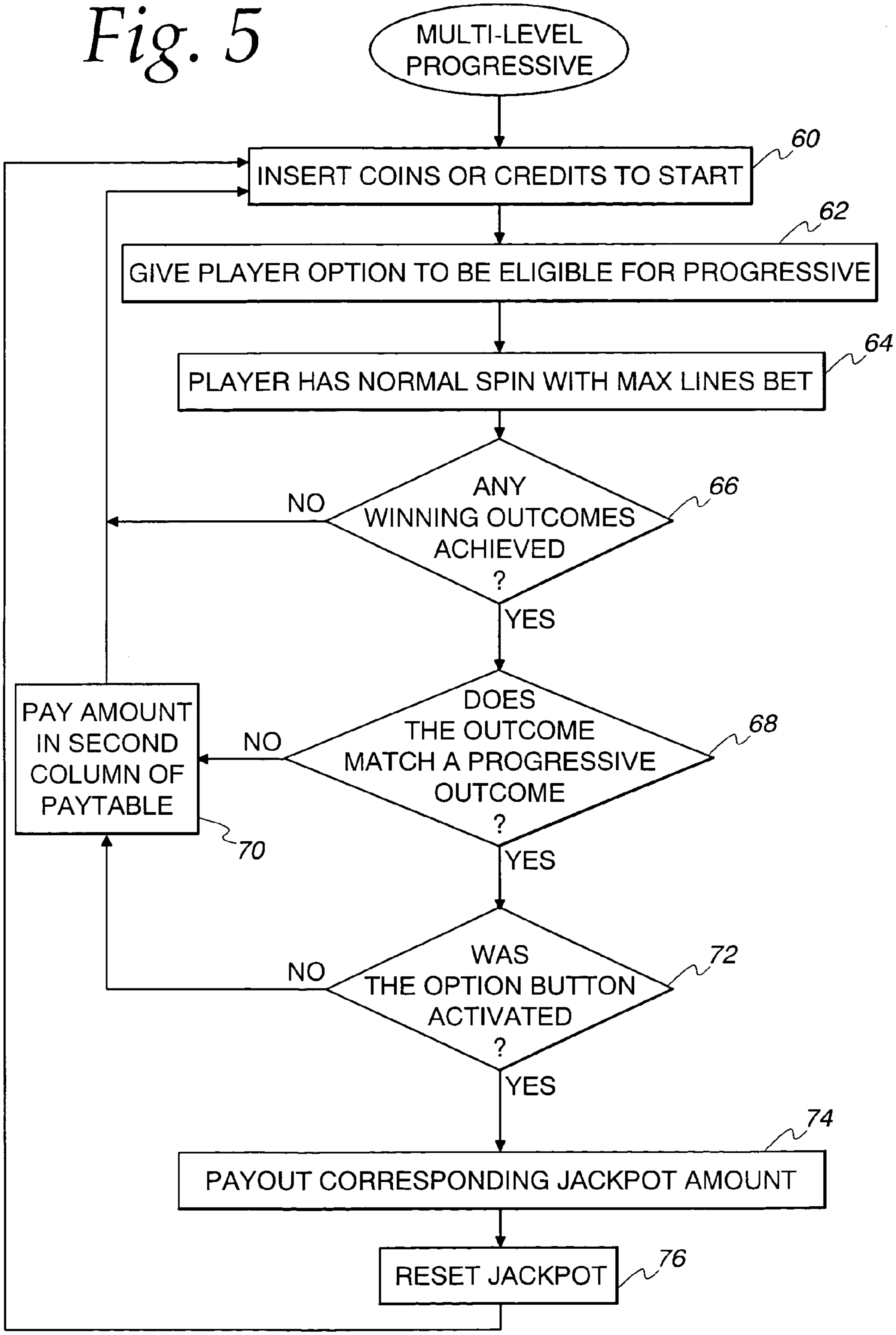
FIG. 5 is a flowchart describing the operation of the gaming terminals and the signage of FIG. 3.
Figure 6:
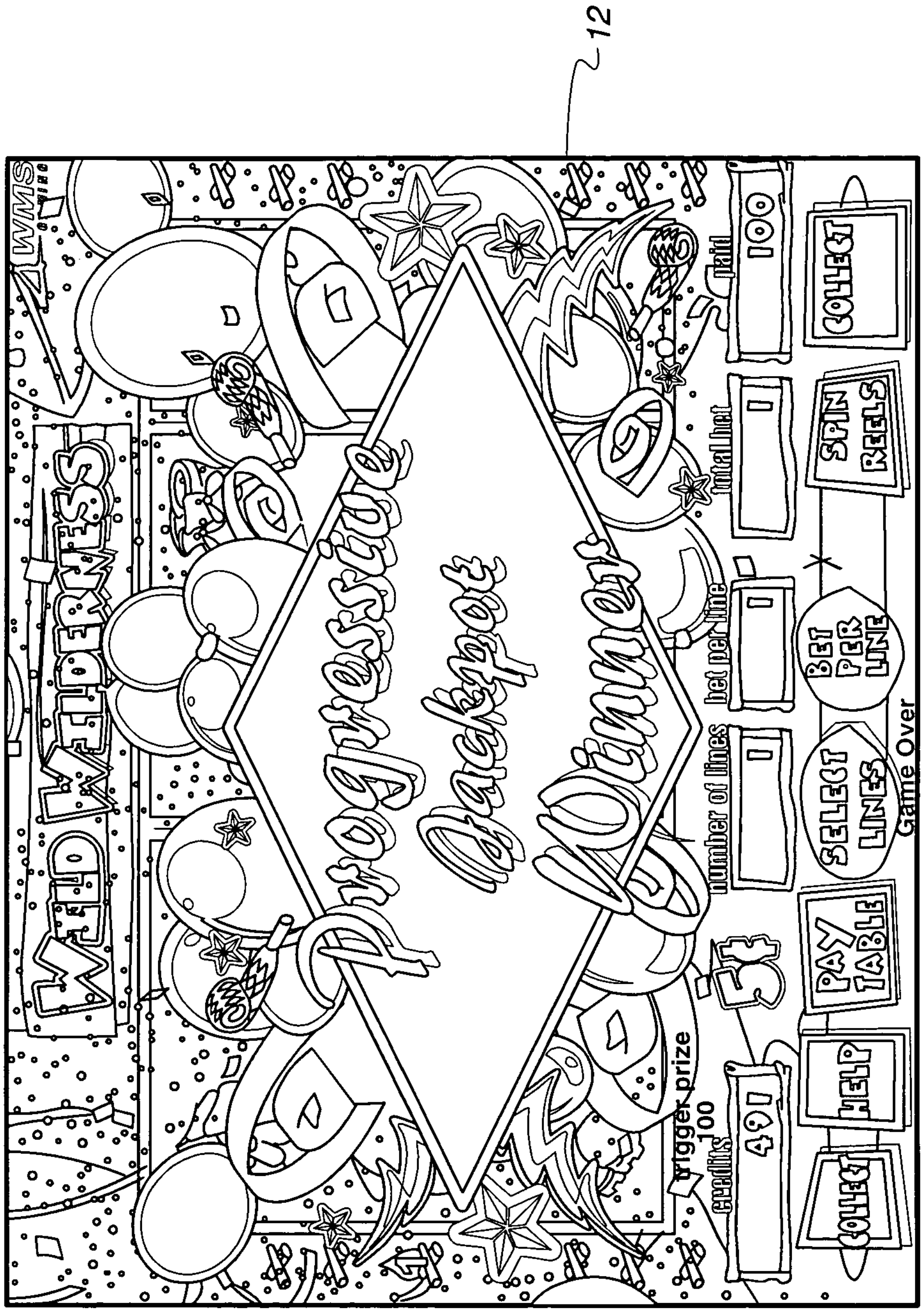
FIG. 6 is an illustration of a progressive payout screen which may be implemented on the gaming terminal achieving the progressive payout at step 74 of FIG. 5.

Turning now to FIG. 5, the operation of entering and awarding the progressive jackpots of the gaming system 28 will be described. Reference to FIG. 6 will be made to best describe this operation. In step 60, a player at the gaming terminal 10 begins a game by any conventional method (e.g., inserting coins or using credits). Each gaming terminal 10*a*,

10*b*, 10*c*, 10*d* has a basic game that involves a player choosing a number of paylines to play and choosing a wager to place on each payline. In some embodiments, there are a maximum of nine paylines. After choosing how many paylines to play, the player selects how many credits (e.g., 1-5) to wager on each payline. At step 62, the player is then given the option to make an additional wager, which would make the player eligible to win one of the progressive jackpots. The player makes the wager by pressing the option key 18 shown on FIGS. 1 and 2.

At step 64, the player operates the game by causing the reels to spin, generating an outcome of various symbols. At step 64, it is determined if any of the outcomes (i.e., arrangement of symbols) shown in the pay table 38 (FIG. 4) are achieved. If the answer is "no," then the gaming system returns to step 60, allowing the player to play again.

If any of the lines match an outcome shown in the pay table 38, the system next determines if that outcome corresponds to an outcome which triggers the jackpot payout at step 68. If the answer is "no," then the player is awarded the amount of credits shown in the second column 42 of the pay table 38 (FIG. 4) as corresponding to that particular outcome at step 70. If the answer is "yes," the gaming device must next determine, at step 72, if the player activated the option key 18 for the progressive jackpot. If the player did not select to play for the progressive jackpot by activating the option key 18, then the gaming system proceeds to step 70 and pays the amount shown in the second column of the pay table of FIG. 4.

If the player did activate the option key 18 at the start of the game, then the gaming terminal proceeds to step 74 and pays out to the player the appropriate progressive jackpot from the third column 44 of the pay table 38 (FIG. 4). The progressive payout is awarded when a progressive outcome, e.g., a combination of basic game symbols, occurs on the screen. The level of the progressive jackpot that is awarded is dependant upon which combination of characters the player has hit in the basic game. For example, as shown in FIG. 4, in an embodiment having three levels of progressive jackpots, three sevens in a line may pay out the lowest or mini jackpot; four sevens may pay out the mid-level or maxi jackpot, and five sevens may pay out the highest or maxi jackpot. As shown in FIG. 4, the player is notified which combination achieves which progressive payout. The player is notified that a progressive jackpot has been awarded (as shown in FIG. 6).

Once one of the levels of a progressive game has been paid out, that level resets itself to the base amount, at step 76. The other progressives that did not pay out keep increasing until someone wins that progressive jackpot. The progressive jackpots are created by a base amount being put into the pot (e.g., $1,000 for the mini, $3,000 for the maxi, and $5,000 for the mega). Then, every time one of the gaming terminals 10*a*, 10*b*, 10*c*, 10*d* in the system 28 is played, a percentage of the amount wagered is placed into each of the progressives. In some embodiments, 1% may go to the mini progressive, ½% to the maxi progressive, and ¼% to the mega progressive. Because the maxi progressive and the mega progressive pay out less often than the mini progressive, less money needs to go to fund these progressives.

After the credits are all awarded and the progressive jackpot has been reset, the program goes back to step 60.

In some embodiments, the option to enter the progressive jackpot is only presented if the player chooses to play all of the paylines.

In another embodiment, this invention is utilized in a video poker machine. The game is played the same as conventional poker games, however, at the beginning of the game, the player activates the option key as described above. Once the player decides how many credits to bet, a hand is dealt, and the player chooses which cards to hold and is dealt new cards. After the hand is over, the player wins a certain amount of credits if their hand corresponds to a poker hand listed in a pay table. Some of the hands will also correspond to the progressive payouts, which are also listed in the pay table. As above, if the player ends the round with a hand (combination of cards or symbols) that corresponds to a winning outcome and if the player has activated the option key, then the player wins that progressive jackpot.

In another embodiment, instead of triggering the mini jackpot, a particular combination of symbols, e.g., three sevens, triggers a bonus game. The bonus game may be any of those known in the art.

In another embodiment, the signage controller 36 also controls the outcome of the progressive payout.

In another embodiment, the progressive jackpots can be triggered by the player choosing to play all of the paylines and placing the maximum wager on each of the paylines. In this embodiment, the progressive jackpots can be triggered by either the player activating the option to enter the progressive jackpot or by playing all of the paylines and wagering the maximum amount on each of the paylines. This increases the player's probability of winning the progressives, because it provides the players with multiple ways to win.

Turning now to FIGS. 7*a* and 7*b*, another embodiment of the present invention will be described. In this embodiment, the progressive jackpots are triggered by a certain combination of symbols on a particular payline. Once the player chooses the side-wager option, the probability of a player winning the progressive jackpot increases. For example, the table shown in FIG. 7*a* illustrates the probability of a player obtaining different winning combinations. In this Figure, a player has approximately a 1 in 23,730 chance of winning the progressive jackpot. FIG. 7*b* illustrates the probability of winning once the player chooses the side-wager option. The odds of the player winning the progressive jackpot increases to approximately 1 in 3125 chance of winning the progressive jackpot. The odds are improved because, as shown in the "Hits" column of both FIGS. 7*a* and 7*b*, the combination of the "PROG" symbol line changes from being only 32 hits in the first game to being 243 hits in the second game.

The probability of winning can be altered by two different methods. In the first method, the symbols on the reel change so that there are more "PROG" symbols actually on each reel. For example, the reel being used during a game without the side-wager function may have only one "PROG" symbol per reel. Once the player chooses to make the side-wager, however, the number of "PROG" symbols per reel may be increased to three. In this situation, the wagering game can be thought of as substituting a second reel for a first reel, where the second reel has more "PROG" symbols.

In the second method, the reel and the number of symbols on each reel stay the same, but the way the gaming terminal reads and evaluates the symbols is changed. In most standard gaming terminals, the gaming terminal only reads and evaluates symbols that fall directly on the paylines for winning combinations. Symbols that fall between the paylines are not counted. In this embodiment, the gaming terminal reads and evaluates the symbols that fall directly on the payline as well as the symbols that fall directly above and directly below the payline (commonly known in the art as scatter). Although there may be only one "PROG" symbol on the reel, to the gaming terminal 10, it appears as though there are three because the one symbol may be in any one of three different locations and still count towards a winning combination. Therefore, in both of these embodiments, the probability of winning the progressive jackpot is increased. In both methods, the payout of some or all of the symbol combinations could be changed when the side-wager is made.

In some of these embodiments, the payment for the side-wager option may be deducted from existing credits that the player has. If the player does not have sufficient credits, the gaming terminal 10 may request that the player add more credits prior to playing the game.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method for playing a wagering game having a special payout, the method comprising:

presenting a basic game having a plurality of randomly selected outcomes being selected independently of player selection, the randomly selected outcomes including a special-payout outcome;

accepting a basic wager from a player for the basic game between a minimum and maximum amount via a wager input device;

presenting an additional, separate side-wager option for a player to place an additional side-wager via the wager input device, the side wager distinct from the accepted basic wager, the side-wager option requiring a side-wager amount in addition to the accepted basic wager;

in response to a player not choosing the side-wager option, one or more processors providing the player with a first probability greater than zero of achieving the special-payout outcome;

in response to the player choosing the side-wager option, the one or more processors providing the player with a second probability of achieving the special-payout outcome, the second probability being greater than the first probability;

via the one or more processors, conducting the basic game with the first probability if the player does not choose the side-wager option, or the second probability if the player chooses the side-wager option; and in response to conducting, crediting the player the special payout when the special-payout outcome occurs in the basic game.

2. The method of claim 1, further comprising crediting the player a second and third payout when, respectively, a second and third randomly selected outcome occurs in the basic game.

3. The method of claim 1, wherein the special payout is a progressive payout contributed to by a plurality of gaming machines including a gaming machine playing the wagering game.

4. The method of claim 1, wherein the special payout is a bonus game.

5. The method of claim 1, wherein the plurality of randomly selected outcomes are indicated by a plurality of symbols.

6. The method of claim 5, wherein each of the plurality of symbols is a card from a deck of playing cards.

7. The method of claim 5, wherein the wagering game is a slot machine and each of the plurality of symbols is a reel symbol.

8. The method of claim 5, wherein providing the player with a second probability of achieving the special-payout outcome comprises increasing the number of winning symbols in the plurality of symbols.

9. The method of claim 5, wherein providing the player with a second probability of achieving the special-payout outcome comprises modifying the method the wagering game uses to read the plurality of symbols.

10. A method for playing a wagering game on a gaming terminal, the wagering game having a progressive payout, the method comprising:

presenting a basic game having a plurality of randomly selected outcomes being selected independently of player selection, the randomly selected outcomes including a progressive-payout outcome;

accepting a basic wager from a player for the basic game between a minimum and maximum amount;

presenting an additional, separate side-wager option for a player to place an additional side wager distinct from the accepted basic wager, the side-wager option requiring a side-wager amount in addition to the accepted basic wager;

presenting a first spinning reel, the first spinning reel providing the player with a first probability greater than zero of achieving the progressive-payout outcome;

presenting a second spinning reel, the second spinning reel providing the player with a second probability of achieving the progressive-payout outcome, the second probability being greater than the first probability; and in response to the player selecting the side-wager option, substituting the second spinning reel for the first spinning reel, increasing the player's probability of winning the progressive payout.

11. The method of claim 10, wherein the substituting step is performed by a controller in the gaming terminal.

12. A gaming terminal for playing a wagering game having a special payout with a first payout and a second payout, the gaming terminal comprising a basic game having a randomly selected outcome being selected independently of player selection;

a basic wager input accepting a basic wager from a player for the basic game on at least one of a plurality of paylines, the basic wager being between a minimum and maximum amount;

the gaming terminal having two options for being eligible for the special payout, the two options including (i) an additional, separate side-wager input option for placing an additional a side-wager distinct from the accepted basic wager, the side-wager option requiring a side-wager amount in addition to the accepted basic wager and (ii) a max-wager option for placing the basic wager at the maximum amount resulting in wagers on each of the plurality of paylines;

wherein, in response to selection of either of the two options, the gaming terminal awards the player the first payout when a first randomly selected outcome is achieved in the basic game and the gaming terminal awards the player the second payout when a second randomly selected outcome is achieved in the basic game; and wherein if neither of the two options is selected, the gaming terminal does not award the player the first payout when the first randomly selected outcome is achieved in the basic game and does not award the player the second payout when the second selected outcome is achieved in the basic game.

13. The terminal of claim 12, wherein the special payout is one of a progressive jackpot and a bonus game jackpot.

14. The terminal of claim 12, wherein the side-wager option is a button or a key.

15. The terminal of claim 12, wherein the first and second randomly selected outcomes comprise a plurality of symbols.

16. The terminal of claim 15, wherein each of the plurality of symbols is a card from a deck of playing cards.

17. The terminal of claim 15, wherein the gaming terminal is a slot machine and each of the plurality of symbols is on a slot reel.

18. The terminal of claim 12, in combination with at least one other gaming terminal for conducting wagering games, each of the gaming terminals having the two options for being eligible for the special payout, the gaming terminals further comprising signage located above and coupled to the gaming terminals, the signage displaying the special payout and for receiving a signal from one of the gaming terminals that the gaming terminal is eligible to win a special payout, the gaming terminals and the signage being a gaming system.

19. The gaming system of claim 18, wherein the signage includes a signage controller for controlling an outcome of the special payout on one of the gaming terminals.

20. The gaming system of claim 19, wherein each of the plurality of gaming terminals includes a gaming terminal controller, the gaming terminal controller being in communication with the signage controller.

21. The gaming system of claim 18, wherein each of the plurality of gaming terminals are identical machines.

22. The gaming system of claim 18, wherein the special payout is a progressive payout.

23. The gaming system of claim 18, wherein the first payout is a bonus game payout.

24. A gaming terminal for playing a wagering game, comprising:

a basic game having a plurality of symbols that indicate a randomly selected outcome of the basic game, the randomly selected outcome being selected independently of player selection, the basic game also having a plurality of paylines;

a progressive payout having a first payout;

a basic wager input to accept a basic wager from a player for the basic game between a minimum and maximum amount, the maximum amount resulting in wagers applied to each of the plurality of paylines; and a side-wager input device for allowing a player to place an additional, separate side-wager distinct from the accepted basic wager, the side-wager option requiring a side-wager amount in addition to the accepted basic wager;

wherein the gaming terminal presents the player with two independent options to be eligible for the progressive payout, the two independent options including (i) the player placing the side-wager via the side-wager input device and (ii) the player placing the maximum amount of the basic wager;

wherein, in response to either of the two options being chosen, the gaming terminal awards the player the first payout when a first randomly selected outcome is achieved and wherein if neither of the two options is chosen, the gaming terminal does not award the player the first payout when the first randomly selected outcome is achieved.

25. The gaming terminal of claim 24, the progressive payout further having a second payout and wherein, in response to either of the two options being chosen, the gaming terminal awards the player the second payout when a second randomly selected outcome is achieved.

26. The gaming terminal of claim 25, wherein in response to the side-wager input device being activated, the gaming terminal awards the player a third payout when a third randomly selected outcome is achieved.

27. A method for playing a wagering game having a special payout, the method comprising:

conducting a basic game having a plurality of randomly selected outcomes selected independently of player selection on a gaming terminal;

accepting a basic wager from a player for the basic game between a minimum and maximum amount, the maximum amount resulting in a wager on each of a plurality of paylines;

presenting an additional, separate side-wager option for a player to place a side-wager distinct from the accepted basic wager, the side-wager option requiring a side-wager amount in addition to the accepted basic wager; and in response to the player selecting either the side-wager option or the maximum amount of the basic wager, crediting the player the special payout when a special-payout outcome occurs in the basic game, and wherein if neither the side-wager option nor the maximum amount of the basic wager is selected, the gaming terminal does not credit the player the special payout when the special-payout outcome occurs in the basic game.

28. A gaming terminal for playing a wagering game having a special payout, the gaming terminal comprising:

a basic game having a plurality of randomly selected outcomes being selected independently of player selection, the randomly selected outcomes including a special-payout outcome that awards the special payout;

a basic wager input accepting a basic wager from a player for the basic game between a minimum and maximum amount;

a side-wager input device to accept an additional, separate side-wager distinct from the accepted basic wager, the side-wager option requiring a side-wager amount in addition to the accepted basic wager;

wherein in response to a player not making a side-wager distinct from the basic wager, the gaming terminal providing the player with a first probability greater than zero of achieving the special payout; and in response to the player making a side-wager distinct from the basic wager, the gaming terminal providing the player with a second probability of achieving the special-payout outcome, the second probability being higher than the first probability, and the gaming terminal further crediting the player the special payout if the special-payout outcome occurs.

29. The gaming terminal of claim 28, wherein the special payout is a progressive jackpot.

30. The gaming terminal of claim 28, wherein the special payout is a bonus game jackpot.

31. The gaming system of claim 28, wherein the plurality of randomly selected outcomes are indicated by a plurality of symbols.

32. The gaming terminal of claim 31, wherein each of the plurality of symbols is a card from a deck of playing cards.

33. The gaming terminal of claim 31, wherein each of the plurality of symbols is a standard slot machine symbol.

34. The gaming terminal of claim 31, wherein the number of symbols comprising the special-payout outcome in the plurality of symbols is increased when the side-wager option is chosen.

35. The gaming terminal of claim 31, wherein the gaming terminal alters its method of evaluating the plurality of symbols to increase the second probability of a winning outcome.

* * * * *